Figure 1:
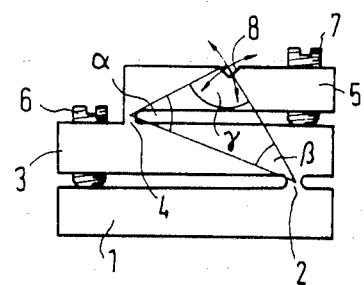

United States Patent [19]

Rossberg

[11] Patent Number: 4,585,193
[45] Date of Patent: Apr. 29, 1986

[54] DEVICE FOR THE ANTIBACKLASH DISPLACEMENT OF OBJECTS IN A COORDINATE SYSTEM

[75] Inventor: Rolf Rossberg, Schwieberdingen, Fed. Rep. of Germany

[73] Assignee: International Standard Electric Corporation, New York, N.Y.

[21] Appl. No.: 617,418

[22] Filed: Jun. 5, 1984

[30] Foreign Application Priority Data

Jun. 18, 1983 [DE] Fed. Rep. of Germany ....... 3321988

[51] Int. Cl.⁴ .............................................. F16L 3/00
[52] U.S. Cl. ........................................ 248/49; 248/65
[58] Field of Search ...................... 248/49, 53, 73, 65, 248/DIG. 13, 487, 284; 350/633

[56] References Cited

U.S. PATENT DOCUMENTS

| | | | |
|---|---|---|---|
| 3,407,018 | 10/1968 | Miller | 248/284 |
| 3,478,608 | 11/1969 | Met | 74/89.15 |
| 3,525,140 | 8/1970 | Cachon et al. | 248/DIG. 13 |
| 3,596,863 | 8/1971 | Kaspareck | 248/487 |
| 3,700,313 | 10/1972 | Karr et al. | 350/633 |
| 3,936,001 | 2/1976 | Clendaniel | 248/65 |
| 4,426,055 | 1/1984 | Reedy et al. | 248/184 |

Primary Examiner—Ramon S. Britts
Assistant Examiner—Ramon O. Ramirez
Attorney, Agent, or Firm—John T. O'Halloran; Thomas P. O'Hare

[57] ABSTRACT

In the device the base and the swivel members consist of three spaced plates disposed one above the other. That is, a baseplate (1), an intermediate plate (3) and a supporting plate (5). The baseplate (1) is connected to the intermediate plate (3) disposed above it, via a first hinge (2) provided for within the area of one longitudinal side, and this intermediate plate (3), in turn, and within the area of the longitudinal side lying opposite the first hinge (2), is connected to the supporting plate (5) disposed thereabove, via a second hinge (4). Both the intermediate plate (3) and the supporting plate (5) are jointly capable of being swivelled about the swivel axis of the first hinge (2) and the supporting plate alone is capable of being swivelled about the swivel axis of the second hinge (4). The supporting plate (5) contains the object receptacle (8) whose center line is in agreement with the axis of the object. The positions of this center line and of the swivel axes are disposed in the corner points of a right-angled triangle, with the spacing between the swivel axes forming the hypotenuse of the triangle. The swivel axes of the hinges (2, 4) and the center line of the object receptacle (8) are staggered in relation to one another in both the horizontal and the vertical direction.

2 Claims, 10 Drawing Figures

DEVICE FOR THE ANTIBACKLASH DISPLACEMENT OF OBJECTS IN A COORDINATE SYSTEM

One prior art device is known from DE-PS 28 39 753 which substantially consists of a ladderlike frame comprising three crosspieces of which the center one has two bearing points on which a first rocker rests. One end of the rocker is compression-spring loaded while the other rocker end is pressed resiliently against an adjusting screw seated in a coverplate of the frame. The first rocker covers a bridge-like upper part. Between this upper part and the lower part likewise comprising bearing points, there is provided a second rocker containing the object to be adjusted, with the one end of this rocker likewise being compression-spring loaded and with the other end thereof again being pressed resiliently against the adjusting screw associated therewith, which is seated in the upper part of the first rocker.

It is the object of the invention to provide a device for the antibacklash displacement of objects in a coordinate system with at least two displacement paths, e.g., for aligning the end faces or the longitudinal axes of optoelectronic components and/or optical fibers, in which the object to be positioned is capable of being moved about the axis of a first swivel member with the aid of adjusting screws, with said swivel member, in turn, capable of being moved about the staggered axis of a second swivel member resting on a support, which is capable of being composed of a small as possible number of simple individual parts which, in addition thereto, can be manufactured in a particularly economical manner.

Various advantages are achievable with the device. It has displacement paths which are within the range extending from micrometers to millimeters. Therefore, the objects as fixed in the corresponding receptacles, can be positioned very exactly. Precision parts are not required for this purpose. Even with the ground (polished) surfaces of the baseplates and of the cylindrical rod it is sufficient to maintain the usual manufacturing tolerances, because neither the thickness nor the diameter is of any considerable importance. The device is mechanically robust as well as insensitive to soiling. It is subjected to hardly any wear and, therefore, has a long service life. Further advantages are set forth in the specification.

Figure 2:
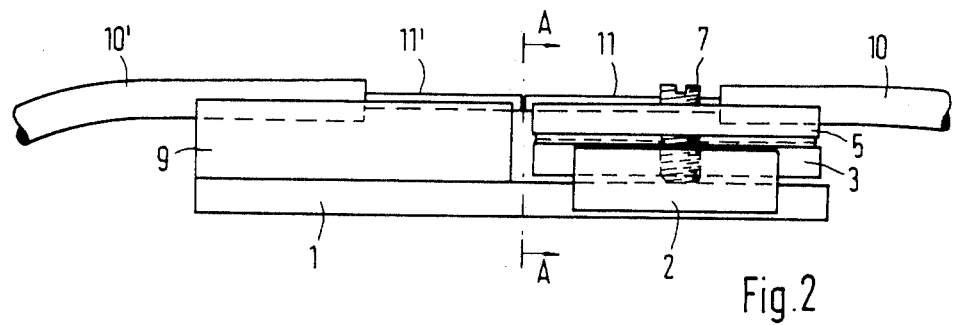
Figure 3:
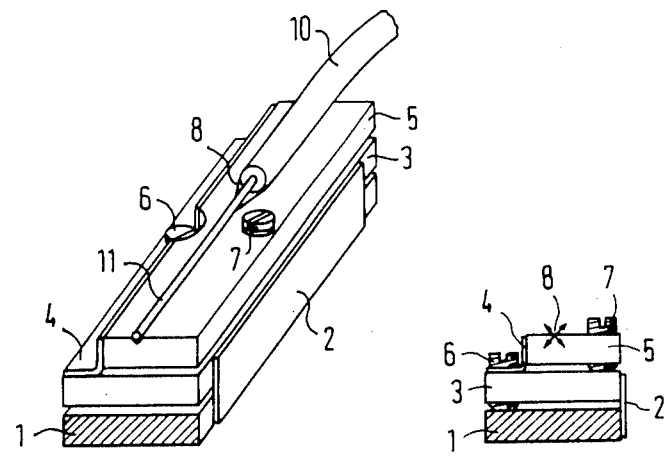
Figure 4:
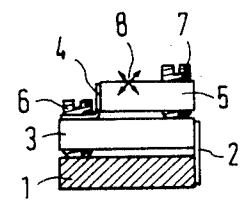
Figure 5:
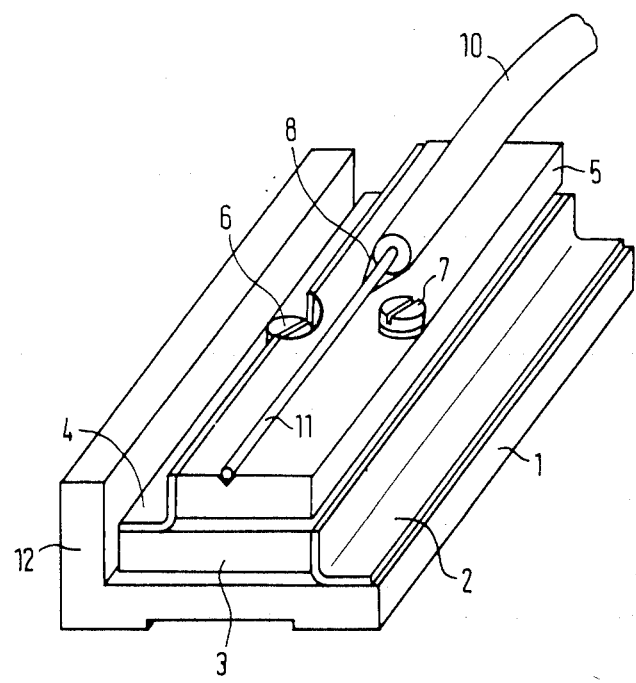
Figure 6:
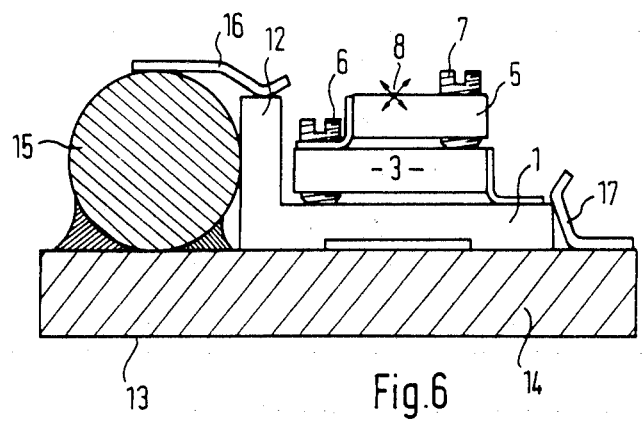
Figure 7:
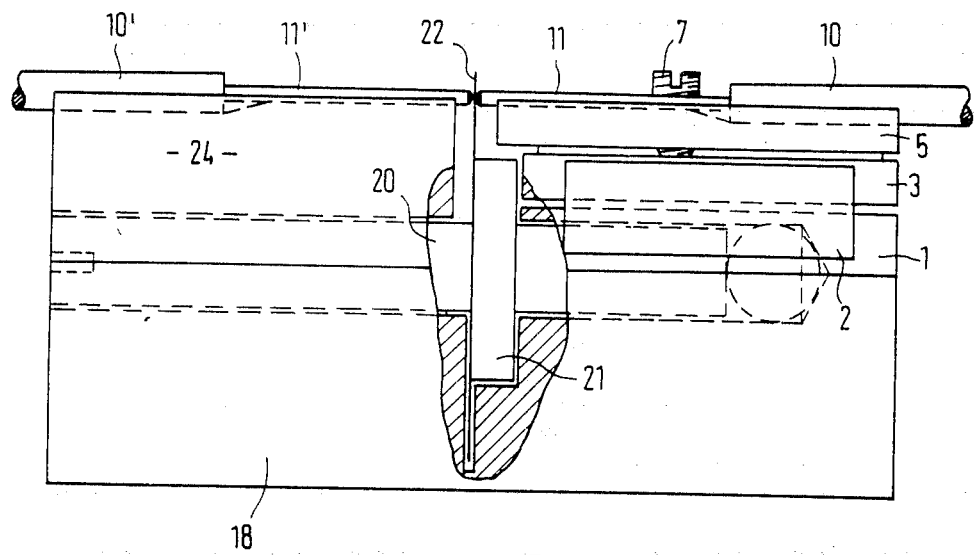
Figure 8:
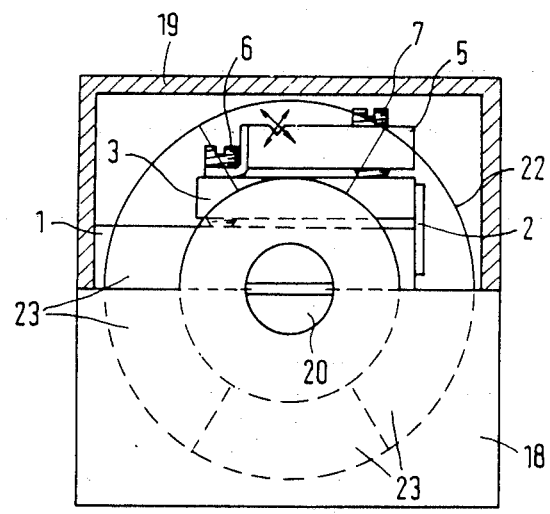
Figure 9:
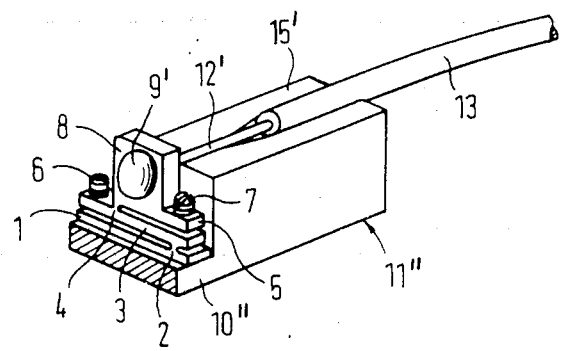
Figure 10:
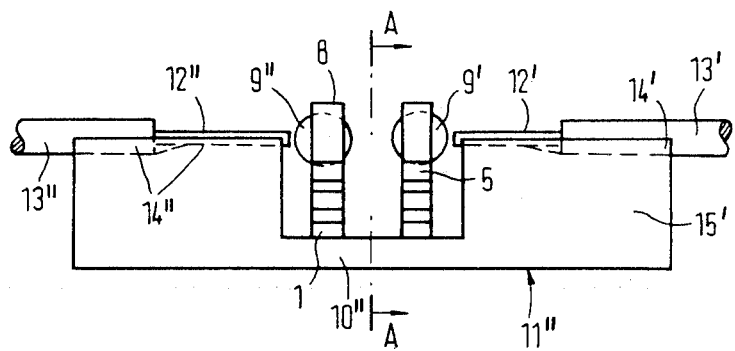

The invention will now be explained as follows with reference to examples of embodiment shown in FIGS. 1 to 8 of the accompanying drawings, in which:

FIG. 1 shows a device with a receptacle for adjusting optical fibers, in a front view, FIG. 2 shows a device designed as a splicing connector with fiber-optic cables fixed therein, in a sideview, FIG. 3 is the sectional view of the device taken along the line A—A of FIG. 2, in a perspective representation, FIG. 4 is the cross-sectional view of the device taken on line A—A of FIG. 2, FIG. 5 shows a device designed as a plug-and-socket connector with a fiber-optic cable fixed therein, in a perspective representation, FIG. 6 shows the device of FIG. 5 as inserted into a socket, partly in a cross-sectional view, FIG. 7 shows the device as inserted into an optical attenuator, with connected fiber-optic cables, partly sectionally, in a sideview, and FIG. 8 shows the device in the operational attenuator as shown in FIG. 7 with a cross-sectionally shown cover, in a front view, FIG. 9 shows a device disposed on the baseplate of an optical component part, in a section taken on line A—A of FIG. 10, in a perspective representation, and FIG. 10 shows two devices arranged on the baseplate of an optical component part, in a sideview.

The device as schematically shown in FIG. 1 consists substantially of three spaced and hingedly connected rectangular plates as well as of two adjusting screws. The lower first plate serves as the baseplate 1 which, via a first hinge 1 provided for within the area of one longitudinal side, is connected to the second plate disposed thereabove, representing an intermediate plate 3. This intermediate plate 3, within the area of the longitudinal side lying opposite the one of the previously mentioned hinge 2, is connected to a third plate disposed thereabove, via a second hinge 4, with this third plate serving as the supporting plate 5.

In the intermediate plate 3 there is seated an adjusting screw 6 acting against the baseplate 1, and in the supporting plate 5 there is seated a further adjusting screw 7 acting against the intermediate plate 3. Both adjusting screws 6, 7 are each disposed within the area of the longitudinal sides of both the intermediate plate and the supporting plates 3, 5 lying opposite the hinges 2, 4.

For the object to be positioned, the supporting plate 5 is provided with a receptacle 8 which, for example, is designed as a V-shaped groove for inserting an optical fiber, as a recess for inserting the housing of an optoelectronic component, or else as a frame for holding in position a spherical lens.

In order to obtain maximum adjusting results, it is attempted to provide an embodiment of the device in which the paths along which the object is to be displaced resemble as closely as possible those of the orthogonal movements. Therefore, both the object and the swivel axes are positioned in such a way that the coordinates thereof form the corner points of a right-angled triangle, with the distance of the swivel axes forming the hypothenuse of the triangle. For this reason, in all examples of embodiment of the displacing device, the movable second hinge 4 comprising the first swivel axis, is disposed in the apex of the angle $\alpha$ and the stationary first hinge 2 comprising the second swivel axis, is disposed in the apex of the angle $\beta$. Moreover, the object receptacle is so designed that its center line, coinciding with that of the object to be adjusted, will come to lie almost in the apex of the right-hand angle $\gamma$. The hinges 2, 4 and the receptacle 8 for the object are preferably disposed in such way that both the swivel axes and the center line of the object receptacle are staggered in relation to one another in both the horizontal and the vertical direction. This is appropriate in order to enable, on the one hand, small dimensions of the device, and, on the other hand, in order to obtain relatively long lever arms for the swivel members. Upon actuating the fine-thread adjusting screws 6, 7, both the intermediate and the supporting plates 3, 5 are swivelled and an object (specimen) fixed in the receptacle 8, is displaced in the direction of both the X and the Y coordinate.

In the device as shown in FIG. 1, the baseplate, the intermediate plate and the supporting plate 1, 3, 5, as well as both hinges 2, 4 consist of one single part. The individual plates are in this case partly separated from one another by way of slots cut therein, with the remaining land portions therebetween forming the hinges.

The device as shown in FIGS. 2 to 4 is capable of being used in an arrangement for establishing spliced connections, from which the fiber-optic cable 10, 10' is removed again after its fiber ends have been fused. The device, however, may also itself form part of the line connection, with optical fibers 11, 11' remaining permanently fixed in the device. Here, both the intermediate plate 3 and the supporting plate 5 are disposed at the end of an extended baseplate 1 the other end of which is provided with an attachment 9. This attachment 9 contains a receptacle with a fiber-optic cable 10' detachably fixed therein, with the optical fiber 11' thereof being almost in a straight alignment with the optical fiber 11 of the fiber-optic cable 10 detachably fixed in the supporting plate 5.

In the device as shown in FIGS. 2 to 4 the hinge 2 connecting the baseplate 1 to the intermediate plate 3 consists of a mechanically stable flat spring plate which, by employing the usual connecting techniques, is secured to the longitudinal sides of the aforementioned plates 1, 3. The hinge 4 connecting the intermediate plate 3 to the supporting plate 5 likewise consists of a simple spring plate which, however, is designed as an angle bar which is secured with one leg to the intermediate plate 3, and, with the other leg, to the longitudinal side of the supporting plate 5 which is of a more narrow design.

The attachment 9 and the supporting plate 5, as well as the intermediate plate 3 are sufficiently spaced from one another so that the ends of the optical fibers 11, 11' as projecting from both sides, and following the exact alignment thereof, can be freely fused to one another and removed from the device thereafter. In cases where the facilities necessary for the fusing of the fiber ends are not available, such as during field-trial use, the fiber-optic cables 10, 10' can remain in the device. For improving the lightwave transmission, however, either an immersion liquid or a transparent adhesive may be applied to the end faces of the fibers. Such connections result in low coupling losses, because the fiber ends are capable of being aligned core to core. Owing to the obtainable high positioning accuracy, the device is not only suitable for connecting graded index fibers, but also for monomode fibers.

The example of embodiment of the device as shown in FIGS. 5 and 6, is designed for establishing plug-and-socket connections. There is used an angle bar the one leg of which forms the baseplate 1. This baseplate 1 is topped by the intermediate plate 3 and the supporting plate 5 in the receptacle 8 of which the optical fiber 11 is fixed. The hinges 2, 4 of both plates 3, 5 each consist of a rectangularly bent spring plate. The other leg 12 of the angle bar preferably standing rectangularly upright from the baseplate 1, is of shorter length. The outer side thereof and the bottom side of the baseplate 1 have ground (polished) surfaces which, in the course of establishing plug-and-socket connections, serve as reference surfaces.

The connector socket 13 as shown in FIG. 6, which is designed for holding and mutually aligning two insertable plug-and-socket devices, consists substantially of a flat baseplate 14 with a ground (polished) surface and a cylindrical rod 15 mounted thereto by lying along one longitudinal edge.

The surface of the baseplate 14 and the likewise ground (polished) jacketing surface of the rod 15 serving as the limit stop serve as the complementary reference surfaces and lines of the plug-and-socket devices, as inserted from opposite sides, are pressed with the aid of suitable spring elements 16, 17. Appropriately, on the cylindrical rod 15 of the connector socket 13 there is mounted for each plug-and-socket device one separate spring element 16 which, with its spring end, presses from above onto the vertical leg 12 of te plug-and-socket device. Similarly, on the baseplate 14 of the connector socket 13, likewise two separate spring elements 17 are mounted which each press against the other free longitudinal edge of the baseplate 1 of the plug-and-socket device.

Such a connector offers the advantage that each of the connector halves comprises an adjusting device with the aid of which the optical fiber can be aligned to a normal (fiber or cross-wire). In this way, the connector halves are interchangeable without having to be readjusted. The individual parts of the connector are simple to manufacture and to assemble. The formerly necessary threading of the optical fibers into sleeves or narrow-tolerated drill holes can be omitted, because the fiber, without causing any danger of its end face being upset or damaged, is only inserted into an open groove and can be easily fixed therein owing to the direct accessiblity. This can be performed with the aid of a simple bonding method requiring no vacuum pressure for sucking the adhesive through a drill hole, thus also preventing the adhesive and the filler from becoming dissociated. Moreover, the adhesive joint can be easily visually inspected with respect to any possible inclusions of voids, bubbles or blisters, thus permitting an easy quality control. Considering that the fiber with the previously prepared end face can be stuck into the receptacle of the plug-and-socket device (connector), the otherwise subsequently required grinding and polishing end face of the fiber can be omitted. Moreover, the end face of the fiber can be set back by a few $\mu$m micrometers from the front edge of the connector, so that in the plugged-in state, a direct contact between the two end faces of the fibers is avoided. Since the adjusting screws, owing to the usually pretensioned hinge springs, are capable of being moved without any backlash, no maladjustment will occur during the fixing of the fiber position.

In FIGS. 7 and 8 the device is shown to form an integral part of an optical attenuator built up on a base 18 with a removable cover 19. In the base 18 there is supported a shaft 20 which is capable of being actuated from the outside with the aid of a screwdriver. The shaft 20 is provided with a collar 21 which serves as a limit stop and for guiding a disk-shaped ambient or optic lightfilter which, distributed in the circumferential direction, comprises a number of ranges 23 with neutral density (grey) filters of different attenuation.

This optic light or neutral density filter 22 is disposed in about the center of the base 18, one half of which carries the device. The baseplate 1 of the device is firmly connected to the base 18, but may also consist of the base itself. In that case, the intermediate plate 3, via the spring plate serving as the hinge 2, is connected directly to the base 18.

The other half of the base is shown to carry an attachment 24 with a V-shaped receptacle groove and a fiber-optic cable 10' fixed therein whose optical fiber 11', which has been stripped of its outer cable sheathing and which is provided with a spherical lens at its end face, is almost in a straight alignment with the optical fiber 11 as clamped in the device, and which, at its end face, is likewise provided with a spherical lens. With the aid of the displacement or adjusting device, the fiber axes can now be very exactly brought into a straight alignment with one another, so that the stepwisely or, if so required, continuously variable attenuator will have an extremely small fundamental attenuation.

As can be seen from FIGS. 9 and 10, the receptacle 8, which is designed as a frame, surrounds a spherical lens 9' mounted therein, for example, by way of bonding. This spherical lens 9', of course, may also be held in the device by way of crimping the correspondingly designed internal edges of the frame, or by being cemented into a depression provided for in the supporting plate 5 or else with the aid of any other conventional mounting methods.

In FIG. 10 two devices each comprising one spherical lens 9', 9", are in such a way disposed at a spaced relationship on the baseplate 10" of a mechanical component part 11" designed as an optical attenuator, that one spherical lens 9', 9" each is positioned in front of each of the end faces at the ends of two optical fibers 12', 12" aligned axially in relation to one another, between which an ambient (optic) light filter (not shown) is capable of being swung. The optical fibers 12', 12" are each stripped at their ends throughout part of the length of their outer cable coatings 13', 13", and are appropriately cemented, together with a partial length of the cable coating, into correspondingly designed V-shaped grooves 14', 14" of cable holders 15'. The latter may consist of sockets which, in one piece, form part of the baseplate 10", or may be mounted as separate parts to the baseplate.

Before the optical fibers 12', 12" are cemented into the V-shaped grooves 14', 14", the fiber ends thereof are brought close to the spherical surfaces of the lenses and temporarily fixed in position. Thereafter, the center of the respective spherical lens, by actuating the adjusting screws 6, 7 is brought into alignment with the axis of the respective optical fiber 12', 12". Thereupon, the end faces, by way of axially displacing the optical fibers 12', 12", are brought into the focal point of the respective spherical lens 9', 9", and secured in this position in a suitable manner, for example, by way of bonding, cementing, soldering, etc.

For reducing the reflection losses, there are preferably used spherical lenses 9', 9" which are coated on one side with a thin antireflecting film, and the space between the fiber ends and the surfaces of the spherical lenses is filled with a transparent adhesive having a correspondingly adapted refractive index, that is, before the ends of the optical fibers 12', 12" are brought into the focal point of the respective spherical lenses 9', 9". This offers the advantage of being able to use optical fibers whose fiber end faces consist of easy-to-manufacture 90° fractions which need to be neither additionally ground nor polished.

Moreover, the capable holders 15' with their V-shaped grooves 14', 14" guarantee a straight alignment of the optical fibers 12', 12" with no phase-angle errors occurring between the axes thereof. Although practically no precision parts are required for manufacturing the device as described hereinbefore, it permits the transmission of a maximum light power, with an approximately parallel path of rays being achieved between the two spherical lenses 9', 9". In this way, and with the aid of simple means, it is possible to manufacture an optical attenuator having a low fundamental attenuation.

I claim:

1. Device for the antibacklash displacement of objects in a coordinate system with at least two displacement paths, e.g. for aligning the end faces or the longitudinal axes o optoelectronic components and/or optical fibers, in which the object to be positioned is capable of being moved about the axis of a first swivel member with the aid of adjusting screws, with said swivel member, in turn, capable of being moved about the staggered axis of a second swivel member resting on a support, wherein the support and the swivel members consist of three plates which are spaced from one another and hingedly connected to each other, with said plates forming a baseplate (1), an intermediate plate (3) and a supporting plate (5), with said baseplate (1) being connected to said intermediate plate (3) as disposed thereabove, via a first hinge (2) provided for within the area of one longitudinal side, with said intermediate plate (3), within the area of the longitudinal side lying opposite said first hinge (2) being connected to said supporting plate (5) disposed thereabove, via a second hinge (4), and that said intermediate plate and said supporting plate (3, 5), for performing the swivel movements, are capable of being actuated by one adjusting screw each (6, 7) which are respectively disposed within the area of the longitudinal sides lying opposite said hinges (2, 4) and wherein a baseplate (14) with a cylindrical rod (15) mounted thereto by lying along one longitudinal edge, with the aid of at least one spring element (16) secured to said rod (15) which, when the plug-and-socket connector is inserted, presses upon the vertical leg (12) thereof, and by at least one spring element (17) which is secured to said baseplate (14) and, when the plug-and-socket connector is inserted, is pressed against the upper free longitudinal edge of the leg lying on said baseplate (14).

2. Device for the antibacklash displacement of objects in a coordinate system with at least two displacement paths, e.g. for aligning the end faces or the longitudinal axes of optoelectronic components and/or optical fibers, in which the object to be positioned is capable of being moved about the axis of a first swivel member with the aid of adjusting screws, with said swivel member, in turn, capable of being moved about the staggered axis of a second swivel member resting on a support, wherein the support and the swivel members consist of three plates which are spaced from one another and hingedly connected to each other, with said plates forming a baseplate (1), an intermediate plate (3) and a supporting plate (5), with said baseplate (1) being connected to said intermediate plate (3) as disposed thereabove, via a first hinge (2) provided for within the area of one longitudinal side, with said intermediate plate (3), within the area of the longitudinal side lying opposite said first hinge (2) being connected to said supporting plate (5) disposed thereabove, via a second hinge (4), and that said intermediate plate and said supporting plate (3, 5), for performing the swivel movements, are capable of being actuated by one adjusting screw each (6, 7) which are respectively disposed within the area of the longitudinal sides lying opposite said hinges (2, 4) and wherein said supporting plate (5) is provided with a receptacle (8) holding a spherical lens (9'), and that two such devices, each comprising one spherical lens (9', 9"), are in such a way disposed at a spaced relationship on the baseplate (10") of an optical component part (11"), that one spherical lens (9', 9") each is positioned in front of each of the end faces at the ends of two optical fibers (12', 12") aligned axially in relation to one another, between which an ambient (optic) light filter is capable of being swung in.

* * * * *